United States Patent
Frerebeau et al.

(10) Patent No.: US 7,441,184 B2
(45) Date of Patent: Oct. 21, 2008

(54) SYSTEM AND METHOD FOR INTERNATIONALIZING THE CONTENT OF MARKUP DOCUMENTS IN A COMPUTER SYSTEM

(75) Inventors: Laurent Frerebeau, Versailles (FR); Luc Creti, Montreuil (FR)

(73) Assignee: Bull S.A., Les Clayes Sous Bois (FR)

( * ) Notice: Subject to any disclaimer, the term of this patent is extended or adjusted under 35 U.S.C. 154(b) by 456 days.

(21) Appl. No.: 10/031,992

(22) PCT Filed: May 22, 2001

(86) PCT No.: PCT/FR01/01563

§ 371 (c)(1),
(2), (4) Date: Jan. 25, 2002

(65) Prior Publication Data

US 2003/0135501 A1  Jul. 17, 2003

(30) Foreign Application Priority Data

May 26, 2000 (FR) .................................. 00 06735

(51) Int. Cl.
*G06F 15/00* (2006.01)
*G06F 17/00* (2006.01)
(52) U.S. Cl. ................ 715/234; 715/237; 715/239; 715/241; 715/248; 715/249
(58) Field of Classification Search ............. 715/513, 715/522, 523
See application file for complete search history.

(56) References Cited

U.S. PATENT DOCUMENTS 5,228,121 A * 7/1993 Fontaine et al. ............. 715/531

5,778,356 A   7/1998 Heiney (Continued)

FOREIGN PATENT DOCUMENTS

WO    WO 97 18516 A    5/1997

OTHER PUBLICATIONS

Bouvier, Dennis J.; Versions and Standards of HTML; Oct. 1995; ACM SIGAPP Applied Computing Review, vol. 3 Issue 2; pp. 9-15.*

(Continued)

*Primary Examiner*—Doug Hutton
*Assistant Examiner*—Nathan Hillery
(74) *Attorney, Agent, or Firm*—Miles & Stockbridge, P.C.; Eric G. King

(57) ABSTRACT

A method for internationalizing a markup document includes detecting a localization tag in the document, retrieving localization information from the document which is associated with the localization tag, searching a translation file for a localized value associated with the localization information, and replacing the localization tag in the document with the localized value found in the translation file. The localization information includes any one or more of a localization attribute, a default localization value, and a value corresponding to an automatic transcription function. A system for internationalizing the markup document includes a first storage unit which stores the markup document, a second storage unit which stores the translation file, and a localization tool which localizes the markup document stored in the first storage unit based on information in the translation file stored in the second storage unit. The localization tool may be implemented in software using, for example, a dynamic code generation language.

24 Claims, 2 Drawing Sheets

U.S. PATENT DOCUMENTS

| | | | | |
|---|---|---|---|---|
| 5,845,303 | A | * | 12/1998 | Templeman ................ 715/517 |
| 5,848,386 | A | * | 12/1998 | Motoyama ..................... 704/5 |
| 5,913,033 | A | * | 6/1999 | Grout ......................... 709/219 |
| 5,956,740 | A | * | 9/1999 | Nosohara .................... 715/536 |
| 5,974,443 | A | | 10/1999 | Jeske |
| 5,987,403 | A | * | 11/1999 | Sugimura ..................... 704/2 |
| 5,991,713 | A | * | 11/1999 | Unger et al. ................... 704/9 |
| 6,026,431 | A | | 2/2000 | Hinrichs et al. ............. 709/203 |
| 6,275,789 | B1 | * | 8/2001 | Moser et al. ................... 704/7 |
| 6,643,652 | B2 | * | 11/2003 | Helgeson et al. ............. 707/10 |
| 6,657,744 | B2 | * | 12/2003 | Lynch et al. ............... 358/1.15 |
| 6,678,518 | B2 | * | 1/2004 | Eerola ..................... 455/422.1 |
| 6,721,747 | B2 | * | 4/2004 | Lipkin ......................... 707/10 |
| 6,850,893 | B2 | * | 2/2005 | Lipkin et al. ................... 705/8 |
| 6,920,608 | B1 | * | 7/2005 | Davis ......................... 715/503 |
| 2002/0002452 | A1 | * | 1/2002 | Christy et al. .................. 704/3 |
| 2003/0140316 | A1 | * | 7/2003 | Lakritz ....................... 715/536 |

OTHER PUBLICATIONS

Nick Dallett: "DHTML Localization on the Windows Update Site" Microsoft.com "en ligne!" Oct. 1999, pp. 1-12, XP002164905, extract of the Internet: URL:HTTP:WWW.MICROSOFT.COM/MIND/1099/LOCALIZE/LOCALIZE.HTM, Extract of Apr. 2, 2001, p. 1-12.

Nancy Weil: "Idiom refines Web translation" CNN.com, 'On Line! Sep. 9, 1999, pp. 1-5, XP002164906, Extract of the Internet: URL: http://www.cnn.com/TECH/computing/9909/09/idiom.idg/index.html; Extract of Apr. 4, 2001, p. 2.

Alex Hopmann et al.: "Web Collection Using XML" W3C. "in Line" Mar. 9, 1997, pp. 1-8, XP002164907, Extract of the Internet: URL:http://www.w3.org/TR/NOTE-XMLsubmit.html, Extract of Apr. 3, 2001, p. 1.-p. 8.

* cited by examiner

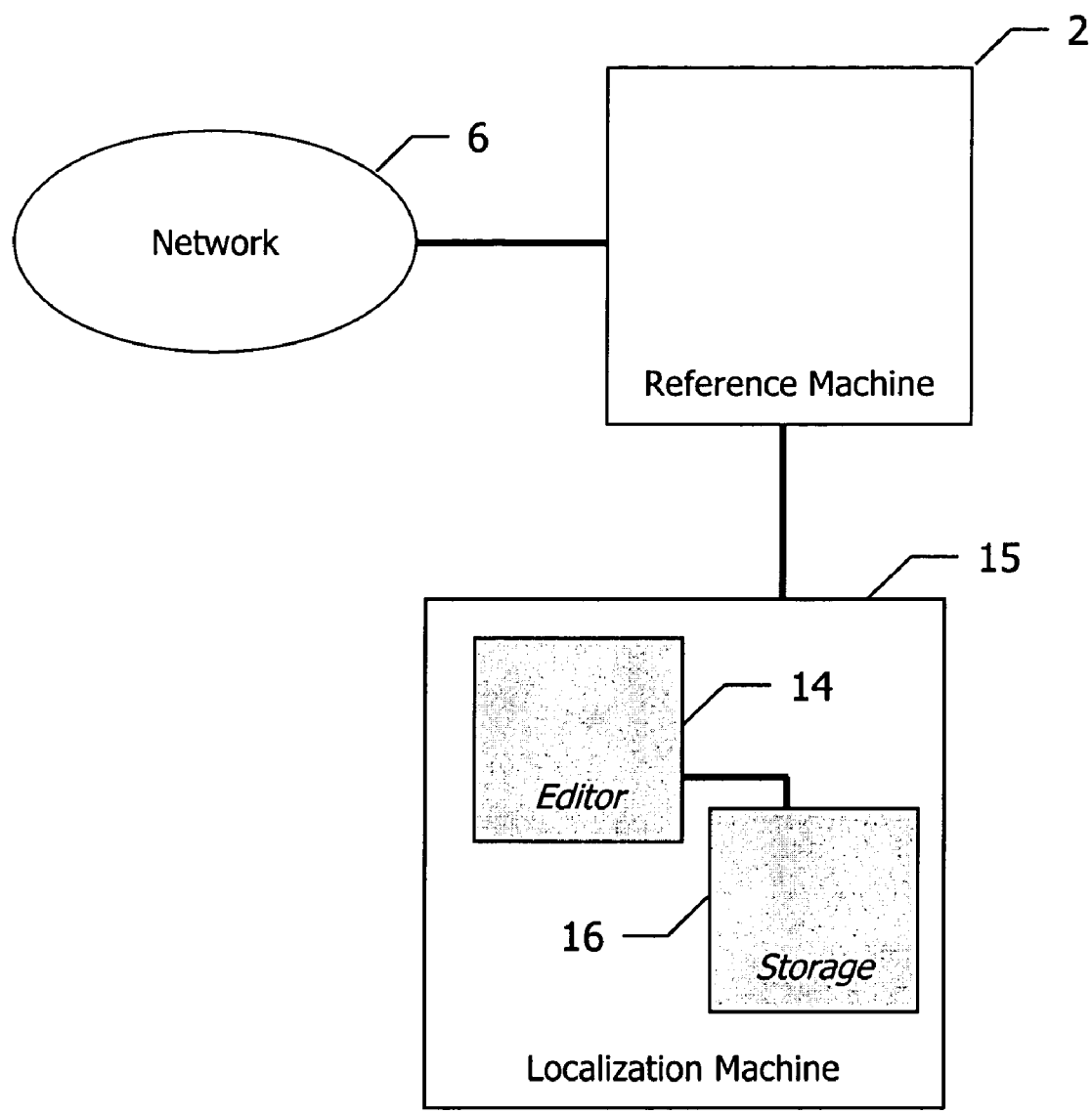

SYSTEM AND METHOD FOR INTERNATIONALIZING THE CONTENT OF MARKUP DOCUMENTS IN A COMPUTER SYSTEM

BACKGROUND OF THE INVENTION

1. Field of the Invention.

The present invention concerns a method for internationalizing the content of markup documents in a computer system, and more particularly the content of pages on the web (more commonly called web pages in computer literature), as well as a system for implementing this method.

PRIOR ART

The present invention relates to the internationalization of markup documents.

The term documents is intended in the broad sense, i.e., a text, a sound extract, a video document, a program, or any other type of information medium or combinations of such mediums.

A markup document is a document that includes tags or markers (both terms are used in computer literature), i.e., special codes that control, in particular, the structure and/or the appearance of the documents in the software using them.

The present application describes the example of a markup page on the Web, i.e. a computer document such as, for example, a text file, an image, or a video into which have been inserted special codes (the tags) that control the structure, the appearance, the dynamic behavior, etc., of the page in the software for navigating on the Web (commonly called a Web browser in computer literature). A Web browser is a piece of software used to present a document to a user, and to keep track of the relationships established between this document and other documents by means of links on the Web (commonly called Web links in computer literature). A Web link is a reference that makes it possible to design an access protocol, a host system, an access path in this system, and possibly an anchor, thus making it possible to access a document or one of its parts.

2. Description of the Related Art.

Today, in the majority of cases, Web pages are created using markup languages. The most commonly used language is HTML (Hyper Text Markup Language). Other languages are beginning to be used, such as XML (extended Markup Language), but they are essentially very similar to HTML.

The internationalization of a document consists of allowing and facilitating the localization of said document into a given language or culture. The localization of a document is the procedure that consists of implementing means for transcribing said document into a given language or culture. Internationalization concerns, for example, the translation of text, sound and/or video messages, etc., the transformation of typed elementary data (dates, numbers, monetary values, etc.), concept representation (representation of an icon of the "DANGER panel" type in the routing code), information sorting (information sequencing), encoding (digital translation of a piece of information into a given format), and the manipulation of information (the manipulation of character sets): concatenation operations, capitalization, etc.), etc.

It is important to note what affects the presentation of a document has more to do with its personalization than its localization. For example, the choice of colors, the character fonts or character sizes, the layout of the paragraphs, etc., is generally not part of the internationalization/localization. On the other hand, certain aspects of the rendition of a document, like accommodating the direction in which texts are read, which creates problems in framing, positioning action buttons, etc., are internationalization problems.

In the case of software internationalization, localization is made necessary by the expansion of markets (increasing foreign sales), by client or even legislative requirements for using software and documents in one's native language, and by constraints related to integration, maintenance, confidentiality or patrimonial protection. Moreover, software designers do not want to handle the dissemination of the sources of their software, explain to third parties the places in which messages must be modified, provide support for the errors resulting from these modifications, reveal trade secrets, etc. the localization must avoid the recompilation or delivery of sources.

Nowadays, there is no solution that handles the internationalization of the content of Web pages. In general, Web page providers simply duplicate the entire page and completely replace the content to be localized, in general manually. Linguistic/cultural experts are required to know the formatting language of the documents, for example the HTML language, and its subtleties, or use HTML page editors. In any case, they are required to have the pages in their entirety, and hence all of the HTML elements, in order to be able to work on them.

SUMMARY OF THE INVENTION

One problem addressed by the invention is for a software editor to be able to internationalize computer (software or other) documents or to offer his clients Web pages that can be internationalized while avoiding any client involvement in the localization process. Localization must avoid the need to translate the document, and for example all of the pages on the Web, into all of the languages.

Another problem is the growing complexity of the HTML language, and of structuring and formatting languages in general, the sophistication of Web page content (the content of the pages is becoming increasingly rich, with a growing number of presentation gimmicks), and the use of advanced (particularly HTML) editors that require more and more expertise on the part of translators.

One object of the present invention consists of allowing markup documents to be localized without any user intervention.

Another object consists of modifying the editors to allow the internationalization of markup pages.

Another object of the present invention consists of facilitating localization operations in a computer system, in particular by avoiding the need to recompile it or to deliver its sources.

SUMMARY OF THE INVENTION

In this context, the subject of the present invention is a method for internationalizing the content of markup documents, which consists of:

detecting a tag to be used in the localization of the document, one or more localization attributes, and possibly a default localization value associated with said tag by means of a localization tool;

searching, if necessary, in storage means in a translation file, for the localized value of the element associated with this or these localization attribute(s);

replacing the tag in the document with the localized value found in the translation file, or with the default localization value, or with a value obtained via automatic transcription functions.

The present invention also concerns a system for internationalizing the content of markup documents, comprising:
   means for storing markup documents;
   means for storing translation files for the documents;
   a localization tool connected to said storage means and allowing the content of the document to be localized using the translation file.

The present invention also relates to a method for editing and internationalizing markup documents that consists, each time during the editing of the document (8) that a user enters content to be internationalized, of associating localization attributes with said content, proposing the entry of a default value of the content to be internationalized, and proposing the entry of all or some of the various values assumed by this content in the various target languages of the document being edited, of creating the document and the associated translation files from information obtained from the user, and storing said files in storage means.

The present invention concerns an editing and internationalization system comprising an editor in a machine for editing markup documents, which makes it possible to create reference files and associated translation files from information obtained from the user and store them in storage means.

BRIEF DESCRIPTION OF THE DRAWINGS

Other characteristics and advantages of the invention will become clear in light of the following description, given as an illustrative and non-limiting example of the present invention, in reference to the attached drawings in which:

FIG. 2 is a schematic view of an embodiment of an editor that allows the internationalization according to the invention;

DESCRIPTION OF THE PREFERRED EMBODIMENTS

Figure 1:
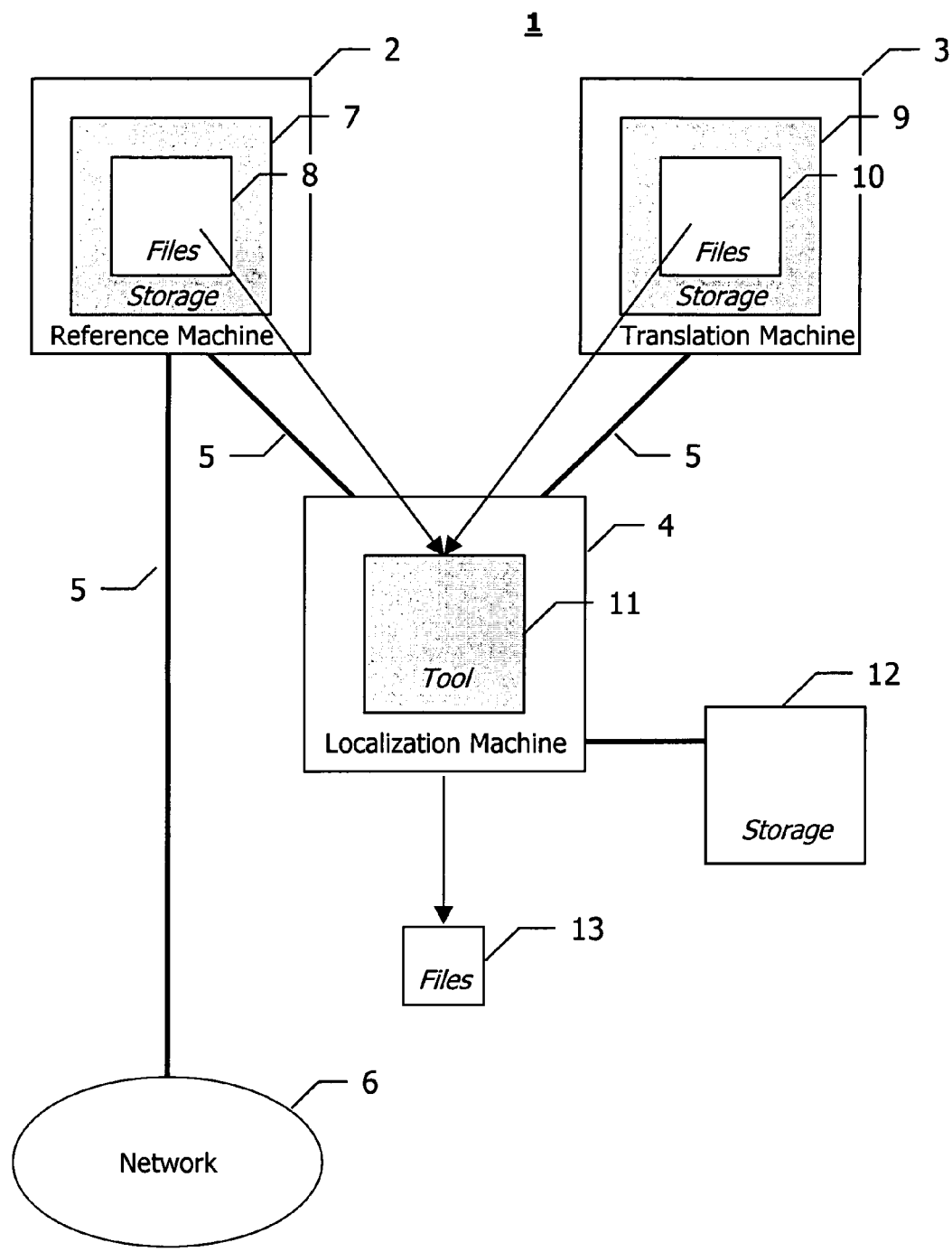
FIG. 1 is a schematic view of an embodiment of the internationalization system according to the invention.

As shown in FIG. 1, which illustrates an embodiment of the internationalization system according to the invention, a computer system 1 is distributed and composed of machines 2-4 organized into one or more networks 5. A machine is a very large conceptual unit that includes both hardware and software. The machines can be quite diverse, such as workstations, servers, routers, specialized machines and gateways between networks. A machine comprises at least one processor, at least one memory, and possibly one or more peripherals. Only the components of the machines of the system 1 that are characteristic of the present invention will be described, the other components being known to one skilled in the art.

It should be noted that the machines 2-4 can be grouped with one another in various ways and can, for example, constitute one and the same machine.

FIG. 1 represents an exemplary embodiment of the internationalization system according to the invention.

The internationalization system according to FIG. 1 comprises a reference machine 2, a translation machine 3, and a localization machine 4.

The reference machine 2, in the example illustrated in FIG. 2, is connected to a network 6 of machines, such as for example the Internet. The reference machine 2 in the embodiment illustrated in FIG. 1 is a server for accessing the network 6. Pages, HTML pages in the example illustrated, are hosted by the server 2 and are retrieved by means of a file transfer protocol or by means of a Web page server interrogation protocol called HTTP (Hyper Text Transport Protocol). The Web browsers present in machines of the network 6 implement this protocol (and several others as well) and download the Web pages and the associated files from one server to another.

The reference machine 2 contains means 7 for storing documents 8, reference files 8 in the example. The reference files 8 contain the information to be localized, expressed in a "pivot" language. The pivot language is the language capable of being the most widely known among translators: its utilization makes it possible to facilitate translations and avoid indirect translations (translation from German to English, then from English to Spanish, instead of a direct translation from English to Spanish if English is chosen as the pivot language). The translation machine 3 includes means 9 for storing translation files 10. The storage means 7 and 9 can be in any format, for example in the form of a hard disk or any other type of memory.

The localization machine 4 contains a localization tool 11 in the form of a software module. The localization tool can use means 12 for storing the correspondence between the type of the document 8 and the markup language used, tags of said markup language and its grammar and syntax, as well as automatic transcription functions. The storage means 12 are contained in the localization machine 4 or linked to the latter. In the embodiment illustrated in FIG. 2, it is in the form of a hard disk. The localization machine 4 makes it possible to create localized files 13 from the reference file 8 and from the translation file 10.

As shown in FIG. 2, the present invention also concerns a Web page editor 14, for example an HTML page editor. The editor 14 is a software module contained in an editing machine 15 and offers any user facilities for writing a Web page. The editor 14 is connected to storage means 16 such as, for example, a hard disk. The editor is connected to a reference machine 2, itself connected to a network 6 of machines, such as for example the Internet. The reference machine 2, as in the embodiment illustrated in FIG. 1, is a server 2 for accessing the network 6.

The system 1 according to the present invention works in the following way.

The system 1 localizes the content of documents 8; in the internationalization system illustrated in FIG. 1, the documents 8 are the reference files 8 that contain the elements to be localized.

The internationalization method according to the invention comprises a step for identifying the type of document 8 to be localized by means of the localization tool 11. The type of the document, and of the reference file in the example illustrated, can be designated, as desired, by using the file name (and more precisely, its extension), a magic number stored in the file header, or a reference to a document that makes it possible to define the format of the document (like, for example, the DTDs, "Document Type Definitions," of the XML language). Thus, in the example of Annex 1, the type of the document is contained in the extension of the reference file 8, for example in the form of a suffix ".html" or ".htm". Then, the tags <HTML>. . . </HTML>, which are characteristic of a Web document constructed with the HTML language, are retrieved.

Depending on the document type, the localization tool selects the markup language to be used to read the document and detect the localization tags, as seen above. The correspondences between the file extensions, for example, and the markup languages to be used, are contained in the storage means 12.

It is important to note that the tools that make it possible to enrich the markup pages with localization attributes, and the software programs that use them, the localization tool in the example illustrated, must use the same conventions for representing localization tags, and the same semantics associated with the various attributes of these tags. The tools for editing markup pages, and the software for interpreting these pages must be able to be configured so as to support different forms of the same tag, as long as this form is unambiguous in the markup language used in the internationalized document. In the embodiments illustrated, the localization tool must be able to recognize the localization tag chosen for the language used.

The method includes a step for identifying each element to be localized in the document 8 in question, i.e., in the reference file 8, by the localization attributes. The localization attributes include at least one type, which may be a default type and hence absent from the tag. They can also include, for example, an identifier, parameters, and specific attributes of the type, as will be seen below. For example, the message "My small business" to be localized into various languages is identified by the unique identifier "1"; it is typed by the type TEXT (the element to be localized is a text).

The method according to the invention is based on the definition of tags designed to mark the identified elements to be localized using the localization attributes.

The method, by means of the localization tool 11 contained in the localization machine 4, consists of detecting in the reference file 8 a tag dedicated to localization, retrieving the localization attribute or attributes associated with said tags, searching in the storage means 9 for the translation file 10 corresponding to the target language or culture, searching in the selected file 10 for said localization attributes and the localization values associated with the unique localization attributes obtained in the reference file 8, and replacing the tags of the reference file 8 with the corresponding localization values provided by the translation file 10.

In the embodiment illustrated in FIG. 1, the method consists of localizing a Web page 8 contained in the Web page server 2.

The tags dedicated to localization use the syntax and the grammar of the tags of the HTML/XML language.

A summary of the characteristics of the HTML language, given below, will facilitate the understanding of the embodiment illustrated.

HTML is a markup language. A tag indicates to a Web browser which elements represent text, headers, links, images, or any other element that may be present on a Web page. The tags have a constant form of the following type: a "<" character, a name, possible parameters (provided in the form parameter-name "=" value-of-the-parameter), and at the end, a ">" character. The HTML language uses, for example, the following tags: <HTML>,<HEAD>, <TITLE>, <BODY>. Web browsers interpret the name contained between the "greater than" and "lesser than" symbols: for example, the name HEAD indicates that the text contained between the HEAD tags is a window title; the browser displays the text in the title bar at the top of the screen of the machine in question.

In general, tags work in pairs, but this is not always the case, as for example with the tag <P>, which alone indicates the start of a paragraph. For tags that work in pairs, the second tag differs from the first one by the character "/" in the second position. For example: <HTML> . . . </HTML>. The purpose of HTML tags is to formalize some of the aspects linked to the presentation and the structuring of the document, and to separate them from the content, the general objective being to have the same page content with different presentations; the presentations differ so as to adapt to the specific machine characteristics (monochrome or color screens), size of the screen, etc.) to the user's preferences (some of which impose the fonts and character sizes to be used for the titles, the texts, the code extracts, etc.), etc.

Annex 1 shows an example of an HTML document. As the example shows, HTML handles the "special" characters with particular keywords (like the "e with a circumflex accent" in the example illustrated, with the keyword "ê"

In the HTML language, there are tags for declaring links to other pages on the Internet, inclusions of images, video, etc.

The HTML language is the subject of several standardization documents (essentially IETF and W3C). Providers of Web browser implementation accommodate these specifications, but add specific characteristics to them, in order to offer users more services and more capabilities for customizing Internet documents. This results in an incompatibility in representation from one browser to another. The following principle was therefore adopted: when a tag in an HTML document is not recognized by the browser, it is simply ignored and nothing is displayed.

The example illustrated is based on pages written in HTML for essentially two reasons:
 the presence of tags that make it possible to isolate the internationalization information from the rest of the information, in particular display information and content,
 the behavior of browsers faced with unknown tags offering debugging and delivery facilities, the reference file being able to be used as a standard provision for the pivot language of the application (the pivot language being the one with which the application works by default).

The present invention can be applied to documents other than Web pages written in HTML, if said documents are formalized with a markup language and the syntax of same is known.

The method according to the invention includes a step for defining tags. In the example illustrated, HTML/XML tags are chosen to be dedicated to the localization of markup/web page content.

For example, the following tags are used:
 for text messages:
  <LOC ID=message-identifier [TYPE=TEXT]> Default text (optional) expressed in the pivot language </LOC>

The type TEXT is the default type; if no other type is mentioned, the type of the element to be localized is the type TEXT by default.

The default text proposed is the one that can be used when a translation file is missing or when the content to be translated is absent from the translation file used for the target language.

The default text makes it possible to do without a translation file for the pivot language.

For the date type fields:
  <LOC TYPE=DATE FORMAT=format> Date and/or time expressed in a neutral format (ex: AAAAM-MJJHHMMSS) parameterizable </LOC>

The format specifies the meaning of the fields expressed in the value provided between the two tags. For example, to represent a time, the value of the FORMAT field is: "HHMM" or "HHMMSS". This format doesn't have much to do with what will actually be displayed (for example: "19:28:30" or "19h28 m30s"), but it makes it possible to give a meaning to the value to be transcribed.

For the number type fields:

<LOC TYPE=NUM FORMAT=format>Number defined in a neutral format (ex: [+|−|]AAA[.BBB][e [+|−|]CCC]) parameterizable </LOC>

The format specifies the meaning of the fields expressed in the value provided between the two tags. For example, to represent an integer, the value of the FORMAT field is: "[+|−|]AAA".

For the currency type fields:

<LOC TYPE=CUR>Number defined in a neutral format (ex: [+|−|]AAA[.BBB]) parameterizable </LOC>

For the image type fields (icons, etc.):

<LOC ID=message-identifier TYPE=NUM> Default path (optional), corresponding to the pivot language </LOC>

In the present example, the tags are not dedicated to a particular language. Their syntax, on the other hand, is that of the HTML and XML languages, thus making it possible to cover a large document folder. The method is applicable to the parent language of these two languages, i.e., the language SGML. The choice of the name of the tag must be configurable: it is essential that there not be any collision with tags that are already defined in the language in which the localization tags must be inserted.

The utilization of the keyword LOC as a tag identifier is proposed as an example. This keyword could be replaced by another keyword (LOCAL, LOCALIZATION, etc.) in other markup languages that are already using this keyword. The choice of this keyword should be made so that it is unique and unambiguous in the markup language used, and so that it is recognized by the various tools manipulating the markup pages (the page editors and the tool 11, in particular).

The presence of a unique identifier of content to be localized associated with each localization tag can be made optional for certain types of data. For digital type data, for example, it is possible to use automatic transcription functions, such as for example standard localization functions (provided in the form of programs, store in the storage means 12 of the tool 11) that make it possible to automate the reformatting of the information in a given language or culture from a pivot data format. For example, in the particular case of English-speaking cultures, these programs make it possible to receive as input a numeric value, and to produce as output a display representation that systematically includes a comma for separating the figures into thousands. They make it possible to automate certain translation tasks, and in particular the rendition of numeric values; they avoid a write operation in the translation files. On the other hand, the presence of a unique content identifier is mandatory for textual content, since it is the search key that will be used to find the localized message in the translation files. This key is justified by the fact that the translation of textual content cannot currently be automated in a completely reliable way, and hence, it is not possible to do without translation files specially formatted to reflect the content of the page to be translated.

Tags as defined above for localization have been inserted into the content of the page illustrated in Annex 1 in order to allow said page to be localized: the localized page appears in two different ways in Annexes 2 and 3. Thus, for example, the text message "My small business" is designated by the following localization tag:

<LOC ID=1>My small business . . . </LOC>

The localization attributes are the following: The identifier designated by the tag is "1 ". The default text expressed in the pivot language, in this case English, is "My small business". The type is not expressed; it is a default type, i.e., the type TEXT.

Annex 2 gives only text messages as examples, i.e. tags of the following type:

<LOC ID= . . . > . . . </LOC>

The content of the page in Annex 3 is simpler but requires the translation file, such as the English translation file in FIG. 4, that provides the value to be associated with each of the identifiers named in the document. In the example of Annex 3, the page cannot be directly displayed in the pivot language: it must move into the localization tool that allows it to be translated.

It is possible to define particular types for information sources not provided by the HTML language that are capable of being localized. For example, in certain countries or in certain working environments, a clanking sound is generated whenever an error occurs. The type of sound emitted when a particular even occurs differs depending on the countries and the customs of each. It is therefore possible to offer an additional type "SOUND" that makes it possible to handle this type of situation. Another example concerns the color conventions used by certain culture to express certain concepts or certain events: abundance or wealth may be represented by yellow or red, and mourning may be represented by black, white or red. It is possible to offer a "COLOR" tag that includes a "CONCEPT" attribute and a "VALUE" attribute for representing this type of situation.

The localization tool 11 detects the localization tags and the localization attributes associated with said tags, searches in the storage means 9 for the translation file 10 corresponding to the target language or culture, then searches in the selected file 10 for the localization attributes and the localization values associated with said unique localization attributes obtained in the reference file 8.

The method also consists of defining said translation file 10. The format of the translation file 10 is not very important: it depends on the tool 11 loaded to perform the localization of the documents. The translation file 10 includes one or more unique localization attributes, and in most cases, as seen above, a unique identifier or identifiers associated with a localized value that corresponds to the identifier for a given language. Annex 4 shows an example of a translation file 10 capable of being associated with the reference file 8 of Annexes 2 and 3 in order to display its content in English. The translation file 10 constitutes the content model; a content model is richer than a structure model: the content model specifies more than just the position of the titles and the paragraphs (which in general are designated by the "structure" of the document). The content model also indicates which information is to be provided, and within it, which information is to be localized (with the associated localization parameters).

In the example illustrated, the localization tool of the localization machine produces a web page from the reference file 8 and the translation file 10. To do this, the localization tool 11 takes the reference file 8 and replaces the localization tags of said reference file 8 with the localized values of the identifiers of said tags given by the appropriate translation file 10.

The tags can delimit messages that contain parameters; in general, the parameters are raw data to be displayed as is. The software programs must be able to handle this type of situation, such as for example error messages of the following type: "Error No. 1001: the file C:\COMMAND.COM does not exist." This error message includes two parameters. The order of appearance of the parameters is important. It is not possible to divide this message, concatenating the following segments of it:

<LOC NUM=1>Error No. </LOC>
<LOC NUM=2>1001</LOC>

<LOC NUM=3>: the file </LOC>
<LOC NUM=4>C:\COMMAND.COM</LOC>
<LOC NUM=5>does not exist.</LOC>.

In fact, certain languages do not translate this message in the same way; they may not accept, or may delete, one of these five message, or even change the order of the parameters or messages. In English, for example, the message may be transformed in the following way:

<LOC NUM=1>Error No. </LOC>
<LOC NUM=2>1001</LOC>
<LOC NUM=3>C:\COMMAND.COM</LOC>
<LOC NUM=4>file does not exist.</LOC>

The method according to the invention therefore consists of numbering the parameters of the messages PARAM 1, PARAM2, etc., and of inserting labels, for example such as "%number", into said messages. The invention handles the preceding case in the following way:

<LOC NUM=1 PARAM1="1001" PARAM2="C:\COMMAND.COM">Error No.%1: the file %2 does not exist </LOC>

In the example of Annexes 2 and 3, the site Quincaillerie.com is a parameter since it does not change no matter what the language, the country or the culture. The tag numbers this first parameter: PARAM 1 and identifies it with the label %1. This information is stored in the reference file. It will be used by the localization tool loaded to re-read the reference file and the files containing the localized messages in order to constitute the final localized document.

It is common for portions of codes in HTML to be generated dynamically on the client end, in the browser, thanks to portions of code written in languages like JavaScript and embedded into the main HTML code.

In order to allow the dynamically generated HTML content to be localized, the method according to the invention consists of:

- implementing the localization tool 11 in the dynamic code generation language, for example in JavaScript;
- including the loading of the code of the corresponding JavaScript localization tool 11 in the main HTML web page (the one that generates HTML code on the fly in the client);
- having the JavaScript localization tool 11 load the translation files 10 required for the localization of the HTML code generated in the client;
- making use of the JavaScript localization tool 11 as the HTML code is generated.

Instead of using a JavaScript version of the localization tool 11, the designer of the Internet document can use CGIs (Common Gateway Interfaces). The CGI components are located in the server 2 and make it possible to execute actions, interrogate databases, etc. they are supposed to generate HTML pages; the CGI standard is an Internet standard. The CGI components are capable of performing the necessary localization operations, by sending this CGI a variable that gives an indication of the target language offered to the user.

The embodiments of the method according to the present invention are quite varied. According to one embodiment, which fits into the context of a software development process, the step for creating localized files is done "in the factory" prior to the storage of all the files of the application on CD-ROM, in which case the localized files are made available to the producer before the burning of the CD-ROM and the localized files are delivered (with or without the reference files) directly on the CD-ROM. This embodiment avoids the need to deliver, document, and maintain the localization tool 11 for third parties.

The localization tool 11 may be delivered (with the reference files 8) to third parties so that they themselves can expand the number of languages supported. This requires a documentation of the reference files 8 in order to facilitate the creation of translation files 10, and the establishment of a structure capable of responding to questions from these third parties.

Another embodiment consists of delivering the localization tool 11 and the reference files 8, the localized files being created upon installation of the software (which saves space on the CD-ROM of said software), on request (sometime after installation) or "on the fly" (i.e., during execution, as explained above in connection with JavaScript solutions embedded into web pages, or the use of CGI processes.

Another embodiment of the invention concerns MP3 CD-ROM readers into which XML files are written. The XML files contain information on the on the titles stored on the CD-ROM, the words associated with each of the titles, and the MP3 encoding of the titles in question. The XML files constitute reference files 8. When the CD-ROM reader reads the XML files, it is connected to a localization tool and translation files that make it possible to create localized XML files based on the country in which one is located.

The method according to the invention is also capable of being implemented in the Web page editor 12. The editor 12, each time a user enters content to be internationalized (a text, in particular), associates a unique identifier with said content, proposes the entry of a default value of the content to be internationalized, and proposes the entry of various values assumed by this content in the various target languages of the document being edited. The editor creates the reference file 8 and the associated translation files 10, and stores them in storage means 16. The editor offers:

- ergonomic entry of these various messages for the various target languages of the document;
- ease in storing and creating translation files 10 that are readable by translators that do not have the tool for editing the content to be localized;
- easy creation of localized content from reference files 8 and translation files 10.

Unlike equivalent editors that might exist for creating particular documents, this editor would have to store localization attributes associated with the document element to be localized: the type of element localized (text, a number, a monetary value, an icon, a sound, a color, etc.), the parameters associated with this type, the parameters associated with the message to be localized (for messages that are partly fixed and partly variable).

One advantage of the present invention is the behavior of browsers faced with unknown tags, and in the present invention the tags dedicated to localization: as seen above, when the browser encounters such tags, it ignores them. Thus, the reference file containing the original page expressed in the pivot language may be used as is, without its being necessary to pass it through the localization tool 11 (with a few exceptions, particularly related to messages with parameters).

Another advantage is the existence of markup language syntax analyzers; they are numerous, space-efficient and very easy to use. The design of the localization tool could be based on an embodiment in existing syntax analyzers.

The present invention concerns the method for internationalizing the content of markup documents 8 that consists of:

- detecting a tag dedicated to the localization of the document 8, the localization attribute or attributes, and possibly a default localization value associated with said tag by means of the localization tool 11;

searching, if necessary, in the storage means 9 in the translation file 10, for the localized value of the element associated with this or these localization attribute(s);

replacing the tag in the document 8 with the localized value found in the translation file 10, or with the default localization value, or with a value obtained via automatic transcription functions.

The method consists of searching for the type of the document 8 in order to recognize the tags used in said document and their grammar and syntax, and performing a detection of the tags dedicated to localization.

The method consists of using as localization attributes a unique identifier, an element type, and possibly parameters and/or specific attributes of the type.

The tag dedicated to localization assumes the formalism of a markup language.

The method consists of using tags that are not provided in the markup language used for localization purposes.

The method consists of creating, prior to the detection, the translation file 10 that includes the localization attribute or attributes of the element or elements to be localized, associated with the corresponding localized value of the localization attribute or attributes in a given language.

Prior to the detection, the localization tool 11 is implemented in a dynamic code generation language, and the code of the tool 11 is loaded into the document 8, which dynamically generates its own code, the replacement of the tags taking place as the code of the document 8 is generated dynamically.

The present invention relates to the system for implementing the method described above, characterized in that it includes the localization tool 11 and the means 9 for storing the translation file. The present invention also relates to a system for internationalizing the content of markup documents 8, comprising:

the means 7 for storing markup documents 8;

the means 9 for storing the translation files 10 of the documents 8; the localization tool 11 connected to said storage means 7, 9 and allowing the content of the document 8 to be localized using the translation file.

The localization tool 11 is implemented in a dynamic code generation language, and the code of the tool 11 is loaded into the document 8, which dynamically generates its own code.

The localization tool 11 is a CGI component.

The present invention concerns a method for editing and internationalizing markup documents 8 that consists, each time during the editing of the document 8 that a user enters content to be internationalized, of associating the localization attribute or attributes with said content, proposing the entry of a default value of the content to be internationalized, and proposing the entry of all or some of the various values assumed by this content in the various target languages of the document being edited, of creating the document 8 and the associated translation files 10 from information obtained from the user, and storing said files in the storage means 16.

The present invention concerns an editing and internationalization system comprising the editor 14 in the machine 15 for editing markup documents 8, which makes it possible to create reference files and associated translation files from information obtained from the user and store them in the storage means 16.

The present invention concerns the method for internationalizing the content of markup documents 8, which consists of:

Defining tags dedicated to localization;

Identifying the information to be localized in the document 8 by means of one or more localization attributes;

Associating the localization tags with the localization attributes in the document 8 in order to allow its localization.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

ANNEX 1

```
<HTML>
  <HEAD>
  <HEAD>
  <TITLE>
  Quincaillerie.com
  </TITLE>
  <BODY>
  <H1><CENTER>My small business...</CENTER></H1>
  Vous êtes sur le site <B>Quincaillerie.com</B><P>
  [You are on the site <B>Quincaillerie.com</B><P>]
  <H2>Small equipment</H2>
    <UL>
      <LI>Nuts</LI>
      <LI>Bolts</LI>
    <UL>
  <H2>Household appliances</H2>
    <UL>
      <LI>Washing machine</LI>
      <LI>Dishwasher</LI>
    <UL>
  <H2>My partners</H2>
    <UL>
      <LI><A HREF="http://www.bullsoft.com">BullSoft</A></LI>
    <UL>
  ...
  <BODY>
<HTML>
```

ANNEX 2

```
<HTML>
    <HEAD>
    <HEAD>
    <TITLE>
    Quincaillerie.com
    </TITLE>
    <BODY>
        <H1><CENTER><LOC ID=1>My small business...</LOC></CENTER></H1>
            <LOC ID=2 PARAM1=" <B>Quincaillerie.com</B>">Vous êtes sur le site de %1</LOC><P>
[<LOC ID=2 PARAM1="<B>Quincaillerie.com</B>"You are on the site %1</LOC><P>]
```

ANNEX 2-continued

```
    <H2><LOC ID=3>Small equipment</LOC></H2>
        <UL>
            <LI><LOC ID=4>nuts</LOC></LI>
            <LI><LOC ID=5>Bolts</LOC></LI>
        </UL>
    <H2><LOC ID=6>Small equipment</LOC></H2>
        <UL>
            <LI><LOC ID=7>Washing machine</LOC></LI>
            <LI><LOC ID=8>Washing machine</LOC></LI>
        </UL>
    <H2><LOC ID=9>My partners</LOC></H2>
        <UL>
            <LI><A HREF="http://www.bullsoft.com">BullSoft</A></LI>
        </UL>
    ...
    <BODY>
<HTML>
```

ANNEX 3

```
<HTML>
    <HEAD>
    <HEAD>
    <TITLE>
    Quincaillerie.com
    </TITLE>
    <BODY>
        <H1><CENTER><LOC ID=1> </LOC></CENTER><H1>
        <LOC ID=2 PARAM1="<B>Quincaillerie.com</B>">
        </LOC><P>
        <H2><LOC ID=3> </LOC></H2>
            <UL>
                <LI><LO ID=4> </LOC></LI> <LI><LOC ID=5> </LOC></LI>
            </UL>
        <H2><LOC ID=6> </LOC></H2>
            <UL>
                <LI><LOC ID=7> </LOC></LI>
                <LI><LOC ID=8> </LOC></LI>
            </UL>
        <H2><LOC ID=9> </LOC></H2>
            <UL>
                <LI><A HREF="http://www.bullsoft.com">BullSoft</A></LI>
            </UL>
        ...
    <BODY>
</HTML>
```

ANNEX 4

1 My small business . . .
2 You are on the site Quincaillerie.com
3 Small equipment
4 Household appliances
5 . . .

We claim:

1. A machine-implemented method for internationalizing a markup document, comprising:
    detecting at least one dedicated localization tag in the document stored using a first storage device, the at least one dedicated localization tag controlling one or more of structure, appearance, and dynamic behavior of the markup document;
    detecting localization information associated with said at least one dedicated localization tag, the localization information including one or more of a unique identifier, a data type, and a default localization value; and
    replacing said at least one dedicated localization tag in the document with one of a localized value of a language translation file stored using a second storage device, the default localization value, or a value obtained using an automatic transcription function,
    wherein said default localization value is used in said replacing step when there is no language translation file or when content to be translated is absent from the translation file,
    wherein the localized value used in said replacing step is obtained by searching the language translation file for a previously determined localized value associated with the localization information, and
    wherein the automatic transcription function is used to obtain the value in said replacing step based on the data type.

2. The machine-implemented method of claim 1, wherein said localization information further includes at least one of a localization attribute and a value corresponding to the automatic transcription function.

3. The machine-implemented method of claim 2, further comprising:
    identifying a type of the document; and
    detecting said at least one dedicated localization tag based on the type of document identified in said identifying step.

4. The machine-implemented method of claim 3, further comprising: recognizing at least one of grammar and syntax used in the document based on the type of document identified in said identifying step.

5. The machine-implemented method of claim 1, wherein said tag is a markup language tag.

6. The machine-implemented method of claim 1, further comprising:
prior to the detecting at least one dedicated localization tag in the document step, creating the language translation file to include information which associates said localization information with said localized value.

7. The machine-implemented method of claim 1, wherein both said detecting steps are performed by a localization tool which is implemented in a dynamic code generation language, said method further comprising:
loading code used to implement said localization tool into the document, said code dynamically generating additional code; and
performing said replacing step as said additional code is dynamically generated by said code used to implement said localization tool.

8. The machine-implemented method of claim 1, wherein said language translation file is maintained using a pivot language.

9. The machine-implemented method of claim 1, wherein the unique identifier for each localization tag is optional for certain data types.

10. The machine-implemented method of claim 1, wherein the unique identifier can be used in searching the language translation file to obtain the previously determined localized value.

11. A method for internationalizing a markup document during editing of the markup document, comprising:
entering a tag to be internationalized, the tag controlling one or more of a structure, an appearance, and a dynamic behavior of the markup document, the tag being associated with localization information, and the localization information including one or more of a unique identifier, a data type, and a default localization value;
associating at least one localization attribute with said tag;
proposing entry of a default value of said tag;
proposing entry of at least one previously determined value corresponding to a target language of the markup document being edited;
receiving information entered by a user;
creating the markup document and an associated language translation file based on information entered by the user; and
storing the markup document and the language translation file in a storage device.

12. The method of claim 11, wherein said language translation file is maintained using a pivot language.

13. A system for internationalizing markup documents, comprising:
an editor which edits a markup document having localization tags and associated localization information, the localization tag controlling one or more of a structure, an appearance, and a dynamic behavior of the markup document, and the localization information including one or more of a unique identifier, a data type, and a default localization value, and the editor also creates a reference file and an associated language translation file based on information entered by a user, the language translation file including previously determined localization values which can be used to replace respective localization tags; and
a storage unit which stores the reference file and the associated language translation file,
wherein said editor proposes entry of a default value of said tag, proposes entry of at least one previously determined value corresponding to a target language of the markup document being edited, and receives said information entered by a user.

14. The system of claim 13, wherein said language translation file is maintained using a pivot language.

15. A system for internationalizing a mark-up document which has at least one dedicated localization tag adapted to be detected by a localization tool and in which localization information associated with the at least one dedicated localization tag is retrieved, the localization information including one or more of a unique identifier, a data type, and a default localization value, said system comprising:
a localization tool which detects the at least one dedicated localization tag, the at least one dedicated localization tag controlling one or more of structure, appearance and dynamic behavior of the mark-up document, and which detects localization information associated with the at least one dedicated localization tag, and replaces the at least one dedicated localization tag with one of a previously determined localized value associated with the localization information, the default localization value, or a value obtained using an automatic transcription function; and
a storage unit which stores the previously determined localized value in a language translation file,
wherein the default localization value is used when there is no language translation file or when content to be translated is absent from the translation file,
wherein the previously determined localized value associated with the localization information is obtained by searching the language translation file, and
wherein the automatic transcription function is used to obtain the value based on the data type.

16. The system of claim 15, wherein said language translation file is maintained using a pivot language.

17. The system of claim 15, wherein the unique identifier for each localization tag is optional for certain data types.

18. The system of claim 15, wherein the unique identifier can be used in searching the language translation file to obtain the previously determined localized value.

19. A system for internationalizing a markup document, comprising:
a first storage unit which stores a markup document having a plurality of dedicated localization tags and associated localization information, the localization tag controlling one or more of a structure, an appearance, and a dynamic behavior of the markup document, and the localization information including one or more of a unique identifier, a data type, and a default localization value;
a second storage unit which stores a language translation file; and
a localization tool which localizes the markup document stored in the first storage unit by replacing each of the dedicated localization tags with one of a previously determined localized value found in the language translation file stored in the second storage unit, the default localization value, or a value obtained using an automatic transcription function,
wherein said default localization value is used when there is no language translation file or when content to be translated is absent from the translation file, wherein the previously determined localized value associated with the localization information is obtained by searching the language translation file, and wherein the automatic transcription function is used to obtain the value based on the data type.

20. The system of claim 19, wherein the localization tool is implemented in a dynamic code generation language, and wherein code used to implement the localization tool is loaded into the document, said code dynamically generating additional code.

21. The system of claim 19, wherein the localization tool is a CGI component.

22. The system of claim 19, wherein said language translation file is maintained using a pivot language.

23. The system of claim 19, wherein the unique identifier for each localization tag is optional for certain data types.

24. The system of claim 19, wherein the unique identifier can be used in searching the language translation file to obtain the previously determined localized value.

* * * * *